April 8, 1958 H. C. HERRMANN 2,829,760
TUBE CONVEYOR
Filed Oct. 18, 1956 2 Sheets-Sheet 2
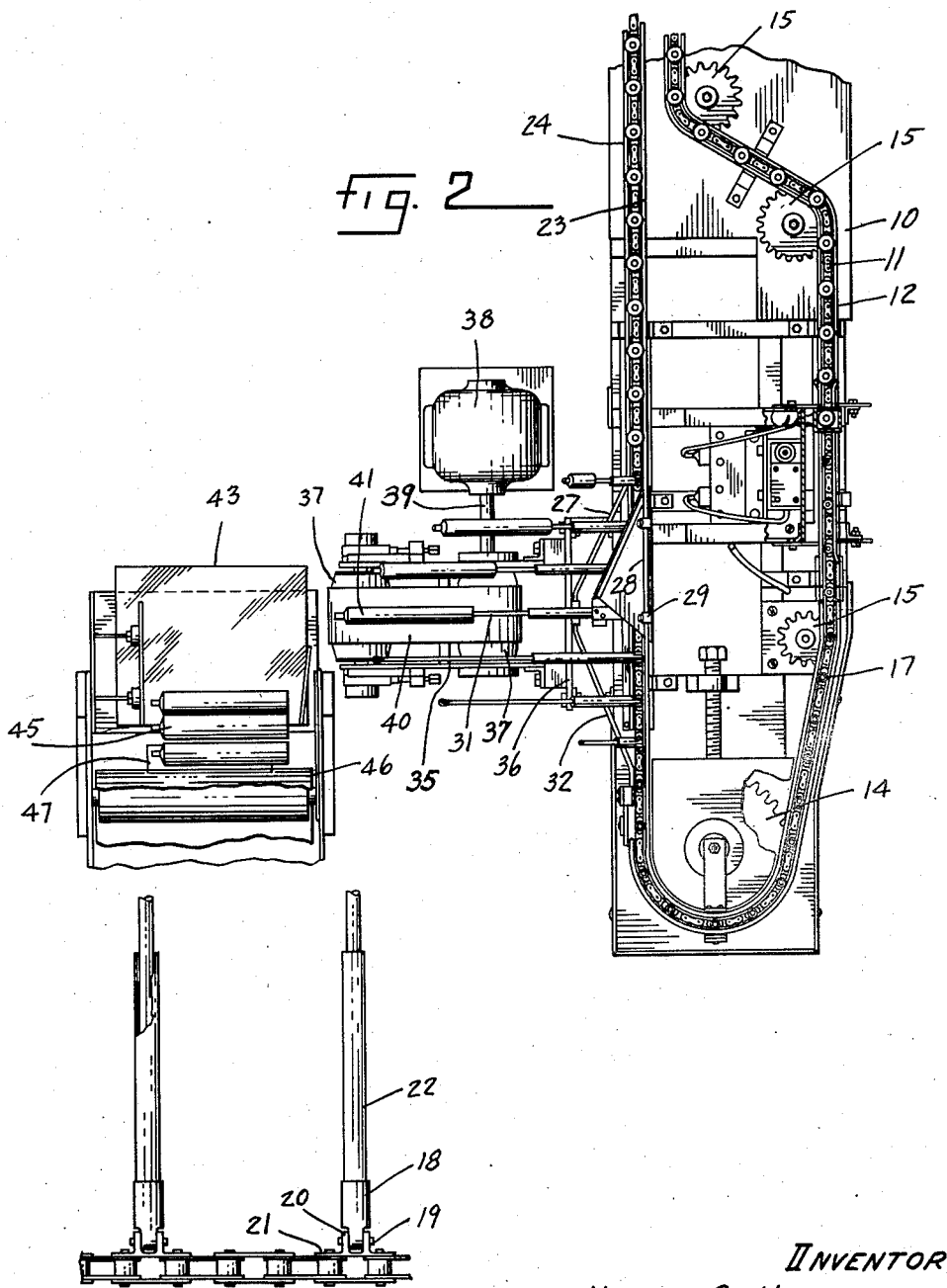
INVENTOR,
HENRY C. HERRMANN,
BY Lockwood, Galt, Woodard & Smith
ATTORNEYS.

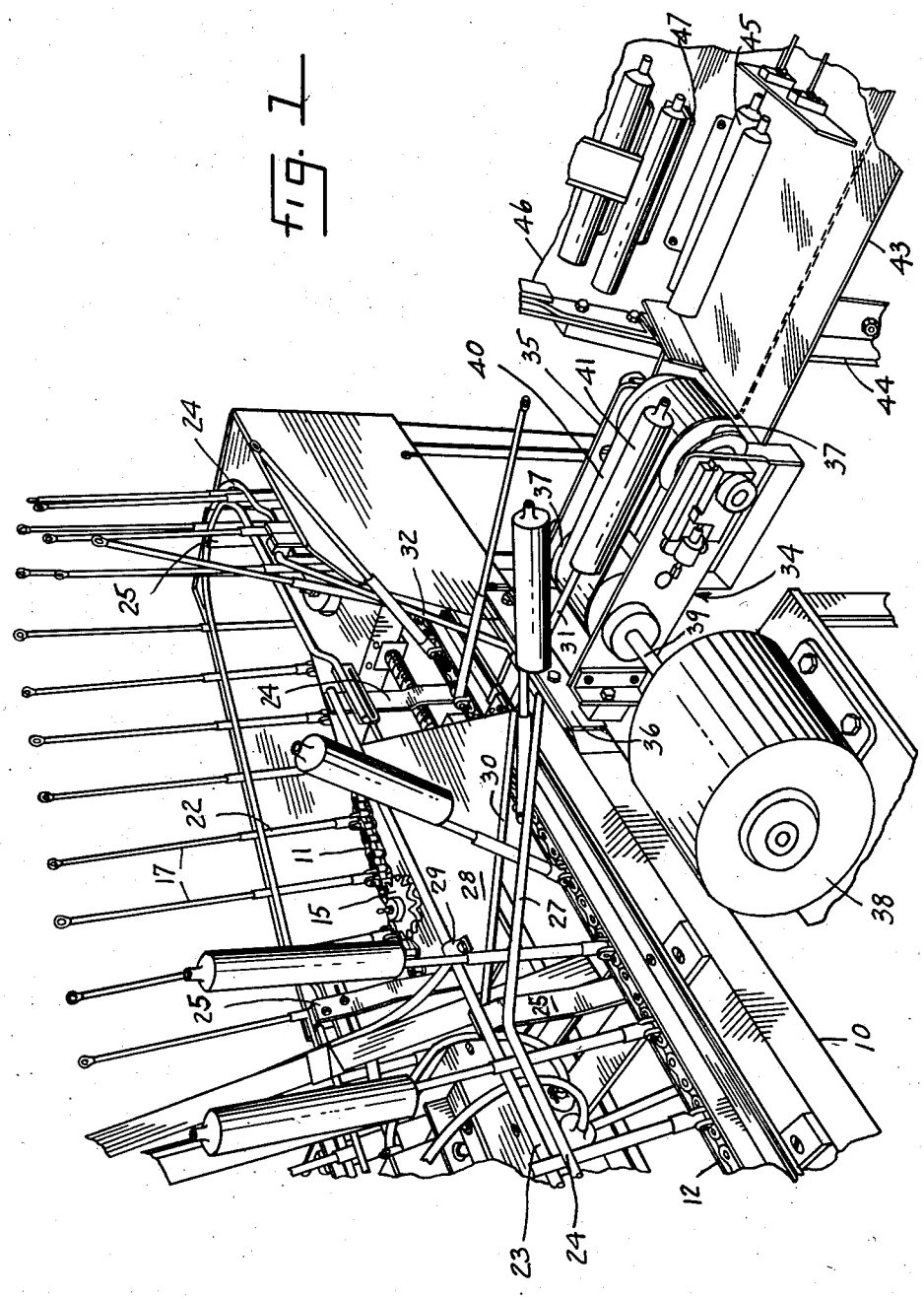

United States Patent Office 2,829,760
Patented Apr. 8, 1958

2,829,760

TUBE CONVEYOR

Henry C. Herrmann, Indianapolis, Ind., assignor to Metal Container Corporation, Indianapolis, Ind.

Application October 18, 1956, Serial No. 616,767

2 Claims. (Cl. 198—33)

This invention relates generally to conveying apparatus and more particularly to conveying apparatus adapted to handle tubular objects.

In the manufacture of tubular containers such, for example, as tooth paste tubes, shaving cream tubes and the like, aluminum may be extruded or otherwise processed to form a tubular container after which the container is passed through an annealing oven. The conventional practice is to pass the containers through the annealing oven on a conveyor and then to remove the hot tubes by hand and place them on a second conveyor which goes to a container painting machine.

This transfer of the containers from one conveyor to another necessarily occurs in the vicinity of the annealing oven whereby the worker is exposed to exceedingly high temperatures. There is the further disadvantage that the worker must handle the hot containers.

Accordingly, the principal object of this invention is to provide conveying apparatus adapted to pass metallic containers through an annealing oven and subsequently discharge said containers on to another conveyor.

In accordance with this invention, there is provided conveyor apparatus having a plurality of vertically disposed container receiving members mounted on an endless chain, the conveyor apparatus including guide means adapted to hold the container receiving members in a vertical position through a major portion of the travel of the conveyor, said guide means including a section adapted to move the container receiving members from a vertical to a horizontal position, and a second conveyor means arranged to engage the containers when the container receiving members are in said horizontal position and to remove said containers from the container receiving members.

The full nature of the invention will be understood from the accompanying drawings and the following description and claims:

Fig. 1 is a perspective view illustrating the conveyor apparatus as provided in accordance with this invention.

Fig. 2 is a top plan view of the apparatus illustrated in Fig. 1.

Fig. 3 is a detail view showing the container receiving members and the means for mounting them on the conveyor chain.

In accordance with this invention there is provided a conveyor apparatus having a supporting frame or base 10 on which is mounted an endless roller chain 11. Only that portion of the conveyor apparatus which embodies this invention is illustrated herein, it being understood that the portion of the conveyor which extends into the annealing oven is not shown. The chain 11 is supported in a channel member 12 throughout its entire length except where the driving sprocket 14 and the idler sprockets 15 engage the chain for driving and guiding it.

A plurality of container receiving rods or fingers 17 may be pivotally mounted on chain 11 by means of sockets 18 connected through pivot pins 19 which pass through ears 20 formed on the chain connecting links 21. Each of the fingers 17 may be suitably fastened within sockets 20 and roller members 22 may be mounted over fingers 17 and rotatably supported within sockets 20 for a purpose which will be described.

Throughout the major portion of the length of the conveyor, the rods or fingers 17 are held in a vertical position by means of guide rails 23 and 24 which are spaced vertically over chain 11 and in parallel with one another by means of upright supporting members 25. The rollers 22 extend upwardly from sockets 20 into engagement with the guide rails 23 and 24 to provide rolling contact with the guide rails thereby to reduce wear and friction between the pins or fingers 17 and the guide rails.

After the tubular containers have passed through the annealing oven, the pins 17 are deflected into a horizontal position by means of guide rail portion 27 and deflecting plate 28 which may be mounted in any suitable manner, such, for example, as by means of clamps 29 secured to the rail 23. The rail 27 and the guiding edge 30 of plate 29 extend outwardly and downwardly into the plane of the frame 10 whereby each finger 17 is guided into a horizontal position as shown at 31.

For resetting the pins or fingers 17 into a vertical position, another guide rail portion 32 is arranged to extend from frame 10 inwardly and upwardly into alignment with the outer guide rail 24.

For removing the tubular containers from each of the fingers 17, there is provided a short endless belt conveyor 34 consisting of a frame 35 mounted on a supporting structure 36 which in turn may be fastened in any suitable manner to the frame 10. A pair of belt supporting pulleys 37 may be rotatably mounted in spaced relation on frame 35 as shown in Figs. 1 and 2. One of the pulleys 37 may be driven by means of a motor 38 through the shaft 39. A belt 40 is mounted on the pulleys 37 in position to engage each tubular container, such, for example, as container 41 when one of the fingers 17 reaches its horizontal position. Such engagement causes each tube to be moved longitudinally and horizontally off of each finger 17.

For receiving the tubular containers as they are discharged from belt 40, there is provided a platform 43 suitably supported by means of a plurality of stanchions 44. Platform 43 slopes downwardly to a slight degree for permitting the tubular containers, such, for example, as 45 to roll into the path of movement of another conveyor belt 46 which is illustrated as extending upwardly from platform 43. Only a portion of belt 46 is illustrated in the drawings since it does not form any part of this invention. Belt 46 includes spaced carriers 47 which receive one container at a time and remove it from the platform 43.

From the foregoing description, it will be apparent that this invention provides conveyor apparatus adapted to pass tubular containers through an annealing oven or through any other form of processing apparatus after which the apparatus automatically removes the containers and transfers them to another conveyor for further processing. In this manner the manual operation of removing the containers is eliminated. This is particularly important where a conveyor system is used in conjunction with an annealing oven which requires removal of hot containers and exposure of a worker to high temperatures.

While this invention has been disclosed as including container receiving rods or fingers adapted to handle tubular containers and mounted on an endless roller chain, it will be obvious to those skilled in the art that other forms of article supporting devices for supporting articles of different character may be substituted for the container receiving rods or fingers. Also it will be obvious that an endless belt may be substituted for the roller chain so long as it is of a type adapted to support article carrying devices. It will be noted that an endless belt conveyor is provided for removing articles from the container receiving rods or fingers, but it is within the scope of this invention to provide conveyor means other than an endless belt for this purpose.

The invention claimed is:

1. Conveyor apparatus comprising a base, an endless channel mounted on said base, an endless chain mounted for movement within said channel, spaced article supporting fingers pivotally supported on said chain with the axis of the pivotal support being parallel to the direction of extension of the chain, bearing sleeves carried by said fingers, conveyor means supported adjacent said channel having a direction of movement transversely away from the chain, dual guide rails spaced above and parallel to said channel to engage opposite sides of said bearing sleeves and thereby hold said fingers in vertical position throughout a portion of their path of movement, a deflector member carried by one of said guide rails and extending into the path of movement of said fingers for deflecting them downwardly toward a horizontal position over said conveyor means, the other of said guide rails including a section extending downwardly and upwardly to and from a point adjacent said conveyor means for supporting each finger as it is deflected into a horizontal position whereby articles loaded on said fingers in vertical position are engaged by said conveyor means and removed from said fingers in horizontal position.

2. Conveyor apparatus comprising a base, an endless chain mounted for movement across said base, spaced article supporting fingers pivotally supported on said chain with the axis of the pivotal support being parallel to the direction of extension of the chain, bearing sleeves carried by said fingers, a conveyor belt supported adjacent said base having a direction of movement transversely away from the chain, dual guide rails spaced above and parallel to said chain to engage opposite sides of said bearing sleeves and thereby hold said fingers in vertical position throughout a portion of their path of movement, a deflector member carried by one of said guide rails and extending into the path of movement of said fingers for deflecting them downwardly toward a horizontal position over said conveyor belt, the other of said guide rails including a section extending downwardly and upwardly to and from a point adjacent said conveyor belt for supporting each finger as it is deflected into a horizontal position whereby articles loaded on said fingers in vertical position are engaged by said conveyor belt and removed from said fingers in horizontal position.

References Cited in the file of this patent

UNITED STATES PATENTS

| Number | Name | Date |
|---|---|---|
| 928,172 | Bernardin | July 13, 1909 |
| 1,749,224 | Ostricher | Mar. 4, 1930 |
| 2,175,560 | Friden | Oct. 10, 1939 |
| 2,355,597 | Pond | Aug. 8, 1944 |